US012506285B2

(12) United States Patent
Polakowski et al.

(10) Patent No.: US 12,506,285 B2
(45) Date of Patent: Dec. 23, 2025

(54) ELECTRICAL PUSH-PIN CONNECTOR

(71) Applicant: MILWAUKEE ELECTRIC TOOL CORPORATION, Brookfield, WI (US)

(72) Inventors: Matthew R. Polakowski, Greenfield, WI (US); Kyle C. Fassbender, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 492 days.

(21) Appl. No.: 17/845,367

(22) Filed: Jun. 21, 2022

(65) Prior Publication Data

US 2022/0407250 A1 Dec. 22, 2022

Related U.S. Application Data

(60) Provisional application No. 63/212,970, filed on Jun. 21, 2021.

(51) Int. Cl.
*H01R 12/58* (2011.01)

(52) U.S. Cl.
CPC .................................. *H01R 12/585* (2013.01)

(58) Field of Classification Search
CPC ....... H01R 12/585; H01R 12/58; H01R 12/50
USPC ............................................................ 439/82
See application file for complete search history.

(56) References Cited

U.S. PATENT DOCUMENTS 2,814,024 A * 11/1957 Narozny ................ H01R 12/58 439/58
2,877,441 A * 3/1959 Narozny .............. H01R 13/052 439/82
2,950,458 A * 8/1960 Artz ..................... H01R 12/718 439/82
2,972,727 A * 2/1961 Flanagan, Jr. ....... H01R 12/718 439/444

(Continued)

FOREIGN PATENT DOCUMENTS

CN 109713475 B 10/2020
DE 10100189 B4 8/2009

(Continued)

OTHER PUBLICATIONS

Infineon, “Assembly Instructions for the Easy-PressFIT Modules,” AN2009-01, Revision 2.4, 2019 (31 pages).

(Continued)

*Primary Examiner* — Harshad C Patel
(74) *Attorney, Agent, or Firm* — Michael Best & Friedrich LLP

(57) ABSTRACT

An electrical system includes a conductor configured to carry energy from an electrical power supply, a receiver configured to output energy to an electrical component, and a connector electrically and mechanically connecting the conductor and the receiver. The connector includes a base and a head extending from the base along a longitudinal axis. The head includes a void defined therein by a radially inner surface and further includes a radially outer surface. At least a portion of the radially outer surface is curved about (Continued)

the longitudinal axis. The head is insertable into the receiver, and elastic deformation of the head causes the connector to press against the receiver to retain the connector and the receiver together.

19 Claims, 7 Drawing Sheets

(56) References Cited

U.S. PATENT DOCUMENTS 3,846,741 A * 11/1974 Kunkle ................ H01R 12/585 439/82
4,036,549 A * 7/1977 Honda ..................... H05K 7/10 439/876
4,183,610 A 1/1980 Key
4,533,204 A * 8/1985 Moynagh, Jr. ....... H01R 12/585 439/82
4,657,336 A * 4/1987 Johnson ................. H01R 12/58 439/852
4,735,575 A * 4/1988 Shaffer ................ H01R 12/585 439/82
4,746,306 A * 5/1988 Yurtin .................. H01R 13/641 439/352
4,752,250 A * 6/1988 Seidler ................. H01R 12/585 439/82
4,790,764 A * 12/1988 Kawaguchi .......... H01R 12/585 439/825
4,854,900 A 8/1989 Muhlhoff
4,894,031 A * 1/1990 Damon ................ H05K 13/003 439/82
4,904,212 A * 2/1990 Durbin ................. H01R 43/205 439/82
4,913,286 A * 4/1990 Tate ..................... H01R 43/205 206/562
5,073,119 A * 12/1991 Soes .................... H01R 12/585 439/82
5,139,446 A * 8/1992 Costello ................. H01R 13/42 439/82
5,374,204 A * 12/1994 Foley ................... H01R 13/114 439/82
5,397,254 A * 3/1995 Powell ................... H01R 12/57 439/885
5,452,512 A * 9/1995 Foley ................... H01R 13/114 29/874
5,509,814 A * 4/1996 Mosquera .............. H01R 12/58 439/82
5,916,000 A * 6/1999 Feldmeier ............ H01R 12/585 439/751
5,951,306 A * 9/1999 Millhimes ............ H01R 13/514 439/717
6,069,481 A * 5/2000 Matsumura .......... G01R 1/0483 324/762.01
6,312,296 B1 * 11/2001 Jones ..................... H01R 13/41 439/943
6,619,999 B2 * 9/2003 Bright .................. G02B 6/3897 439/943
6,652,293 B2 * 11/2003 Fuchs .................. H01R 4/2406 439/694
6,722,928 B1 * 4/2004 Noda ................... H01R 12/585 439/82
6,764,318 B1 * 7/2004 Fajardo .................. H05K 3/308 439/82
6,809,537 B2 * 10/2004 Adams ............... G01R 31/2808 439/74
6,875,032 B2 * 4/2005 Tsuchiya .............. H01R 12/585 439/82
7,083,434 B1 * 8/2006 Blossfeld ............. H01R 12/585 439/82
7,090,501 B1 * 8/2006 Scherer ............. H01R 13/6585 361/65
7,249,981 B2 * 7/2007 Chen .................... H01R 12/585 439/751
7,255,612 B2 * 8/2007 Noguchi .............. H01R 12/585 439/82
7,273,398 B2 * 9/2007 Taylor ..................... H05K 3/326 439/620.2
7,377,823 B2 5/2008 Chen
7,491,897 B2 * 2/2009 Watanabe ............. H05K 3/308 174/266
7,527,535 B2 * 5/2009 Mueller ................. H01R 12/58 439/825
7,540,744 B1 * 6/2009 Minich .................... H05K 1/18 439/65
7,618,283 B1 * 11/2009 Costello ................. H01R 12/52 439/511
7,670,196 B2 * 3/2010 Fedder ................. H01R 12/585 439/751
7,753,742 B2 * 7/2010 Fedder ................. H01R 12/585 439/751
7,780,483 B1 * 8/2010 Ravlich ................ H01R 12/585 439/82
7,789,716 B2 * 9/2010 Fedder ............... H01R 13/6474 439/607.07
7,828,561 B2 * 11/2010 Gueckel ............. H01R 12/7064 439/82
7,883,378 B2 * 2/2011 Yamashita ............. H05K 1/119 439/75
7,931,507 B2 * 4/2011 Yu ........................ H01R 13/426 439/744
7,946,861 B2 * 5/2011 Sander ................. H01R 12/585 439/82
8,075,321 B1 * 12/2011 Costello ............... H01R 12/585 439/77
8,105,093 B2 1/2012 Zhang et al.
8,118,611 B2 * 2/2012 Jeon ....................... H01R 31/08 439/511
8,371,871 B1 * 2/2013 Murphy ............... H01R 12/585 439/444
8,545,237 B2 * 10/2013 Johnson ................. H05K 3/368 439/75
D708,584 S * 7/2014 Endo ............................ D13/154
8,992,235 B2 * 3/2015 Kataoka ................. H01R 13/05 439/82
9,166,310 B2 * 10/2015 Ludwig ................ H01R 12/585
9,211,400 B2 12/2015 Bachinski et al.
9,225,226 B2 12/2015 Weber et al.
9,276,338 B1 * 3/2016 Dariavach ............ H01R 12/585
9,673,574 B2 * 6/2017 Endo ...................... H01R 43/24
10,003,152 B1 * 6/2018 Bianca ................... H01R 43/20
10,153,568 B2 * 12/2018 Goto .................... H01R 12/585
10,476,191 B2 * 11/2019 Venaleck ............... H01R 12/91
10,644,423 B2 * 5/2020 Watanabe .............. H05K 3/308
10,680,360 B2 * 6/2020 Yagyu .................... H05K 1/184
10,700,445 B2 6/2020 Huber
10,855,009 B2 * 12/2020 Choi ................. H01L 23/49555
10,879,641 B2 * 12/2020 Takeuchi ............. H01R 13/113
11,038,292 B2 * 6/2021 Ludwig .................. H05K 3/325
11,476,600 B2 * 10/2022 Price ...................... H01R 12/73
11,616,330 B2 * 3/2023 Herring ................ H01R 12/585 439/82
2001/0046817 A1 * 11/2001 Putnam ................ H01R 12/585 439/751
2005/0250356 A1 11/2005 Matsumura et al.
2006/0264076 A1 * 11/2006 Chen .................... H01R 12/585 439/82
2007/0270001 A1 * 11/2007 Matsumura ............ H05K 3/284 439/82
2007/0293100 A1 * 12/2007 Jakob ................... H01R 12/585 81/488
2008/0032568 A1 * 2/2008 Fedder ................. H01R 12/585 439/862
2008/0207015 A1 * 8/2008 Sueyoshi ............... H05K 3/325 439/75
2008/0305695 A1 12/2008 Yodogawa
2009/0104823 A1 * 4/2009 Ludwig ................ H01R 12/585 439/857
2011/0159743 A1 * 6/2011 Johnescu ............. H01R 12/585 29/874

(56) References Cited

U.S. PATENT DOCUMENTS

| | | | | |
|---|---|---|---|---|
| 2012/0126646 | A1* | 5/2012 | Nakagawa | H02K 5/225 310/71 |
| 2012/0252232 | A1* | 10/2012 | Buck | H01R 43/20 439/55 |
| 2012/0289102 | A1* | 11/2012 | Moll | H01R 12/585 439/890 |
| 2013/0244512 | A1* | 9/2013 | Endo | H01R 13/052 439/889 |
| 2014/0302723 | A1* | 10/2014 | Zhao | H01R 12/585 439/751 |
| 2016/0049890 | A1 | 2/2016 | Mergener et al. | |
| 2016/0067483 | A1 | 3/2016 | Bachinski et al. | |
| 2016/0190718 | A1* | 6/2016 | VanZuilen | H02K 3/522 310/71 |
| 2016/0190728 | A1* | 6/2016 | VanZuilen | H01R 13/5202 310/71 |
| 2017/0346202 | A1* | 11/2017 | Goto | H01R 13/2457 |
| 2017/0358876 | A1* | 12/2017 | Smith, Jr. | H01R 12/585 |
| 2018/0205163 | A1* | 7/2018 | Sorig | H01R 13/03 |
| 2018/0287277 | A1* | 10/2018 | Lybrand | H01R 12/515 |
| 2020/0287305 | A1* | 9/2020 | Yagyu | H01R 13/03 |
| 2021/0084745 | A1* | 3/2021 | Kim | H01L 23/40 |
| 2023/0017724 | A1* | 1/2023 | Neef | H01R 12/585 |

FOREIGN PATENT DOCUMENTS

| | | | | | |
|---|---|---|---|---|---|
| DE | 102008026732 | A1 | | 12/2009 | |
| DE | 102010029867 | A1 | | 12/2011 | |
| DE | 102012223322 | A1 | | 6/2014 | |
| DE | 102014018832 | A1 | | 7/2015 | |
| DE | 102018111628 | A1 | | 11/2019 | |
| EP | 0717468 | A2 | * | 11/1995 | |
| EP | 2835872 | A1 | | 2/2015 | |
| EP | 2658036 | B1 | | 6/2019 | |
| EP | 4224638 | A1 | * | 8/2023 | H01R 12/585 |
| JP | 2001319716 | A | * | 11/2001 | H01R 12/585 |
| KR | 101474486 | B1 | | 12/2014 | |
| KR | 20180031468 | A | * | 2/2018 | |
| WO | 2019123063 | A1 | | 6/2019 | |

OTHER PUBLICATIONS

International Search Report and Written Opinion for Application No. PCT/US2022/034296 dated Oct. 13, 2022 (12 pages).

* cited by examiner

ELECTRICAL PUSH-PIN CONNECTOR

CROSS-REFERENCE TO RELATED APPLICATIONS

This application claims priority to U.S. Provisional Patent Application No. 63/212,970, filed Jun. 21, 2021, the entire contents of which are incorporated herein by reference.

FIELD

The present disclosure relates to electrical push-pin connectors. More particularly, the present disclosure relates to elastically deformable push-type pin conductors for use in electrically connecting one or more components together.

BACKGROUND

Electrical components such as battery cells and printed circuit board assemblies (PCBAs) are typically fastened together during fabrication of larger electrical systems (e.g., a battery pack, a power tool assembly having a motor, etc.). Such fastening methods traditionally include welding, soldering, or the like such that electrical connection is made within a portion of the electrical system once the components have been fastened together.

SUMMARY

The present disclosure provides, in one aspect, an electrical system including a conductor configured to carry energy from an electrical power supply, a receiver configured to output energy to an electrical component, and a connector electrically and mechanically connecting the conductor and the receiver, the connector including a base, and a head extending from the base along a longitudinal axis, the head including a void defined therein by a radially inner surface, the head further including a radially outer surface, at least a portion of the radially outer surface curved about the longitudinal axis, wherein the head is insertable into the receiver, and wherein elastic deformation of the head causes the connector to press against the receiver to retain the connector and the receiver together.

The present disclosure provides, in another aspect, a push-pin connector for an electrical system, the push-pin connector including a central longitudinal axis, a first deformable wall having an arcuate cross-section, the first deformable wall extending from a base on a first side of the central longitudinal axis, and a second deformable wall having an arcuate cross-section, the second deformable wall extending from the base on a second side of the central longitudinal axis, the first deformable wall and the second deformable wall spaced from the central longitudinal axis by a first distance in an undeformed condition, and the first deformable wall and the second deformable wall spaced from the central longitudinal axis by a second distance in a deformed condition, the first distance being greater than the second distance, wherein the first deformable wall and the second deformable wall are resiliently biased toward the undeformed condition to press outwardly relative the central longitudinal axis.

The present disclosure provides, in yet another aspect, an electrical system including a conductor configured to carry electrical energy from a power supply, a push-pin base coupled to the conductor, a push-pin head extending from the push-pin base along a longitudinal axis, the push-pin head including a radially inner surface at least partially curved about the longitudinal axis, the radially inner surface defining a void, and a radially outer surface at least partially curved about the longitudinal axis, the radially outer surface cooperating with the radially inner surface to define an overall deformable semi-annular cross-section of the push-pin head having an outer diameter. The electrical system further including a printed circuit board assembly electrically and mechanically connected to the push-pin head to output electrical energy from the conductor to a component, the printed circuit board assembly including at least one socket including an inner electrically conductive surface that is circular in cross-section, wherein at least a majority of the radially outer surface of the push-pin head electrically and mechanically contacts the inner electrically conductive surface of the socket, wherein the outer diameter of the push-pin head is reduced to a deformed condition with the push-pin head received in the socket, and wherein the overall deformable semi-annular cross-section of the push-pin head is resiliently biased to an undeformed condition in which the outer diameter of the push-pin head is not reduced.

Features and aspects of the disclosure will become apparent by consideration of the following detailed description and accompanying drawings.

Figure 1:
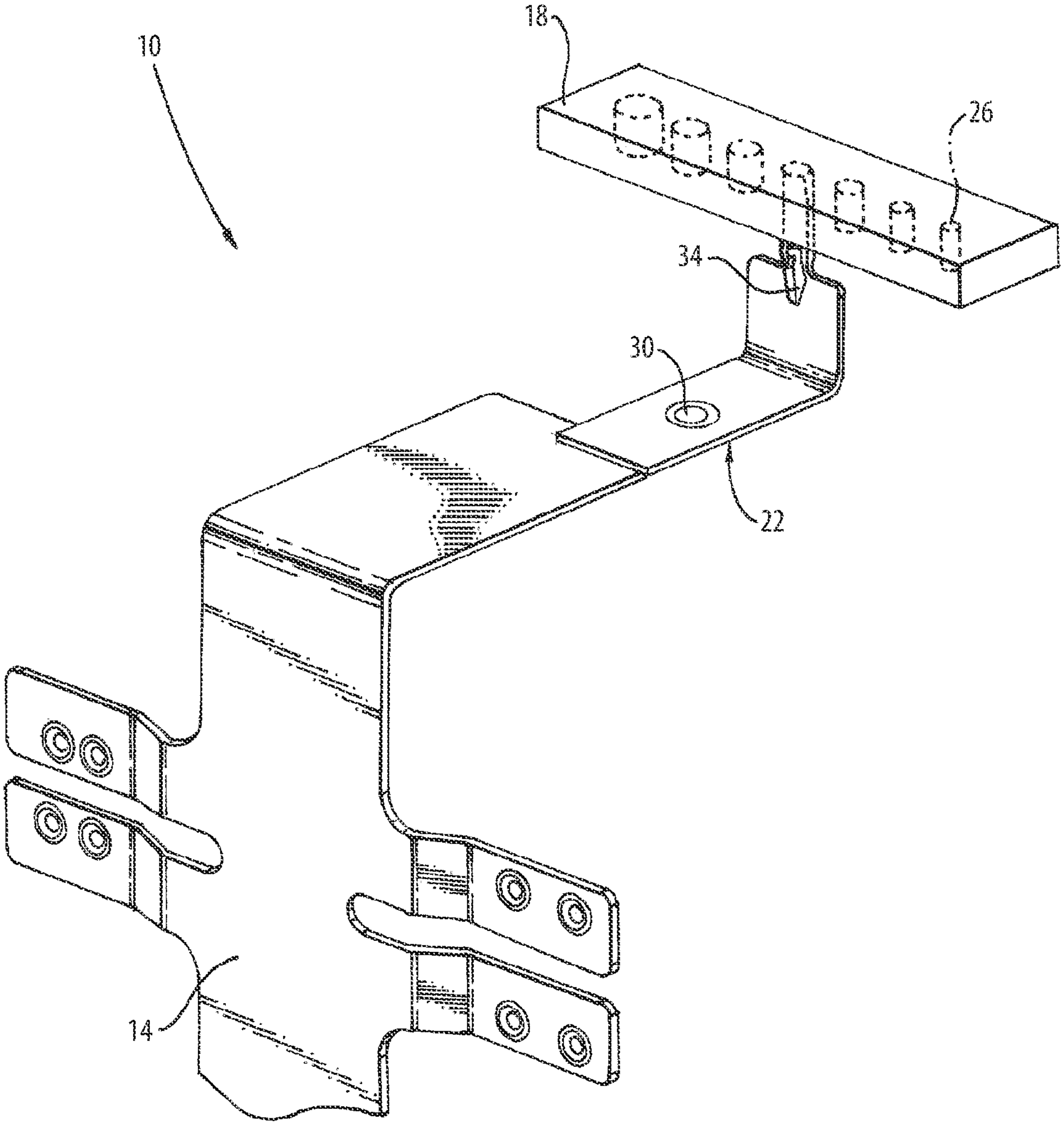
FIG. 1 is a perspective view of a portion of an electrical system including a conductor connected to a receiver by a connector, according to embodiments disclosed herein.

Before any embodiments of the disclosure are explained in detail, it is to be understood that the disclosure is not limited in its application to the details of embodiment and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting.

DETAILED DESCRIPTION

With reference to FIG. 1, an embodiment of at least a portion of an electrical system 10 is shown. The electrical system 10 generally includes a conductor 14 for electrically conducting or carrying energy from an electrical power source (e.g., battery, DC power source, AC power source, etc.), a receiver 18 for outputting energy and/or logic to an electrical component (e.g., a power tool, a motor, etc.), and a connector 22 for electrically and mechanically connecting the conductor 14 and receiver 18 together.

The conductor 14, according to some embodiments, is an electrically conductive voltage tap capable of carrying voltage and signal from the power source, although the conductor 14 need not carry both voltage and signal to be incorporated into the electrical system 10. The conductor 14, according to other embodiments, is a power strap capable of carrying current from the power source. In such example embodiments, the voltage tap/power strap is connected to the power source and the connector 22. It should be understood that while a single conductor 14, receiver 18, and connector 22 are illustrated in FIG. 1, any number of conductors 14, receivers 18, and connectors 22 may be included in the electrical system 10.

The receiver 18, according to some embodiments, is a printed circuit board assembly (PCBA) 18 including one or more sockets 26, recesses, apertures, or the like that are sized and shaped to receive a portion of the connector 22. Each of the sockets 26 of the PCBA 18 include an electrically conductive inner or contact surface. In some embodiments, the sockets 26 are inserted into a portion of the PCBA 18 while in other embodiments, the sockets 26 are integrally formed in the PCBA 18. The PCBA 18 and/or sockets 26, as well as the connector 22, may include a surface finish such a tin plating, zinc plating, conductive paint coating, or another conductive-type surface finish. In at least one embodiment, the PCBA 18, sockets 26, and connector 22 are plated with tin, although some applications of the electrical system 10 call for fewer of the PCBA 18, sockets 26, and connector 22 to be tin plated.

In some embodiments of the electrical system 10, the conductor 14 and the connector 22 are fastened together. In other embodiments, the conductor 14 and the connector 22 are integrally formed with one another. In the illustrated embodiment, the connector 22 includes a base 30 and a head 34 extending from the base 30 that is receivable in the socket 26. The connector 22 may also be referred to as a push-pin 22. In some embodiments, the push-pin 22 is elastically deformable and insertable into the socket 26 to provide a holding force. In some embodiments, welding or soldering of the push-pin 22 and the PCBA 18 may be obviated to reduce cost and time of manufacturing.

Figure 2A:
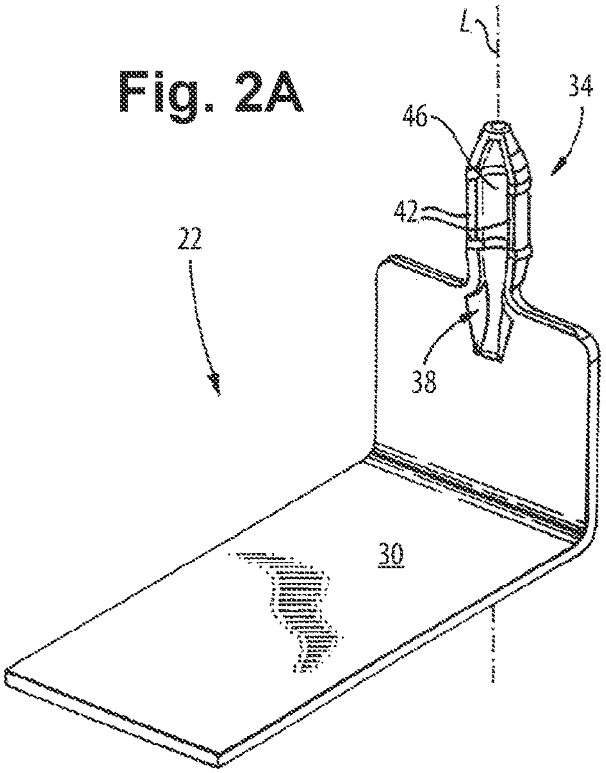
FIG. 2A is a perspective view of an example embodiment of a connector useable in the system of FIG. 1.
Figure 2B:
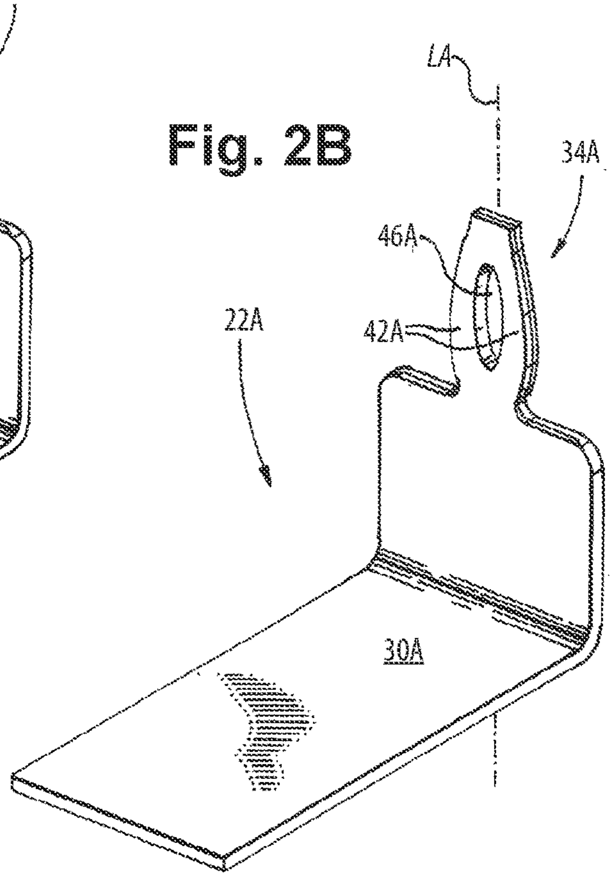
FIG. 2B is a perspective view of another example embodiment of a connector useable in the system of FIG. 1.
Figure 2C:
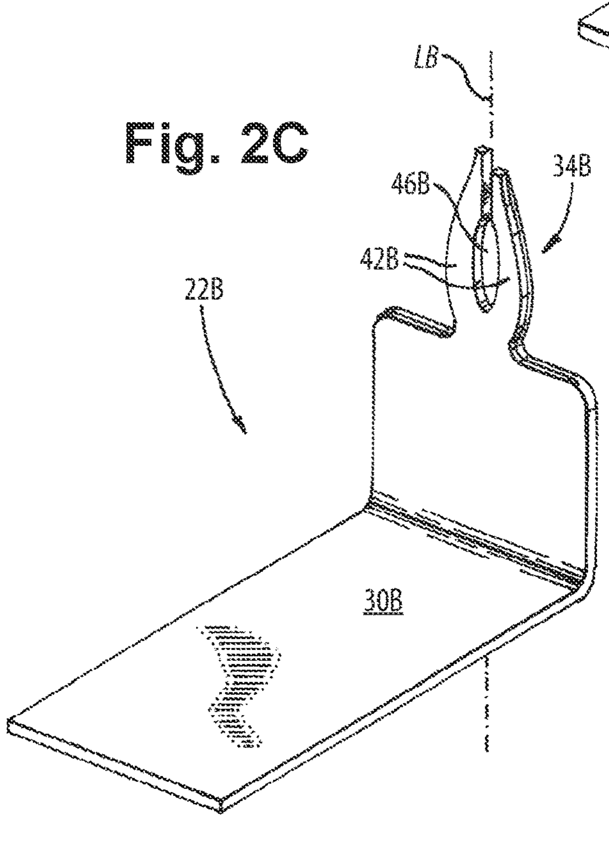
FIG. 2C is a perspective view of another example embodiment of a connector useable in the system of FIG. 1.

With reference to FIGS. 2A, 2B, and 2C, multiple example embodiments of the connector 22 are shown. As illustrated in FIG. 2A, a first embodiment of the connector 22 is the push-pin 22, which includes the base 30 and the head 34. As illustrated in FIG. 2B, another embodiment of the connector 22A includes a base 30A and a head 34A extending from the base 30A. As illustrated in FIG. 2C, yet another embodiment of the connector 22B includes a base 30B and a head 34B extending from the base 30B. The head 34, 34A, 34B of each of the connectors 22, 22A, 22B includes a frame 38, 38A, 38B elongated along a longitudinal axis L, LA, LB. The frame 38, 38A, 38B has opposing walls 42, 42A, 42B positioned on opposite sides of the longitudinal axis L, LA, LB. The walls 42, 42A, 42B define a cavity 46, 46A, 46B, void, recess, or the like defined at least partially therebetween and centrally aligned along the longitudinal axis L, LA, LB. The cavity 46, 46A, 46B may be generally elliptical.

Figure 3:
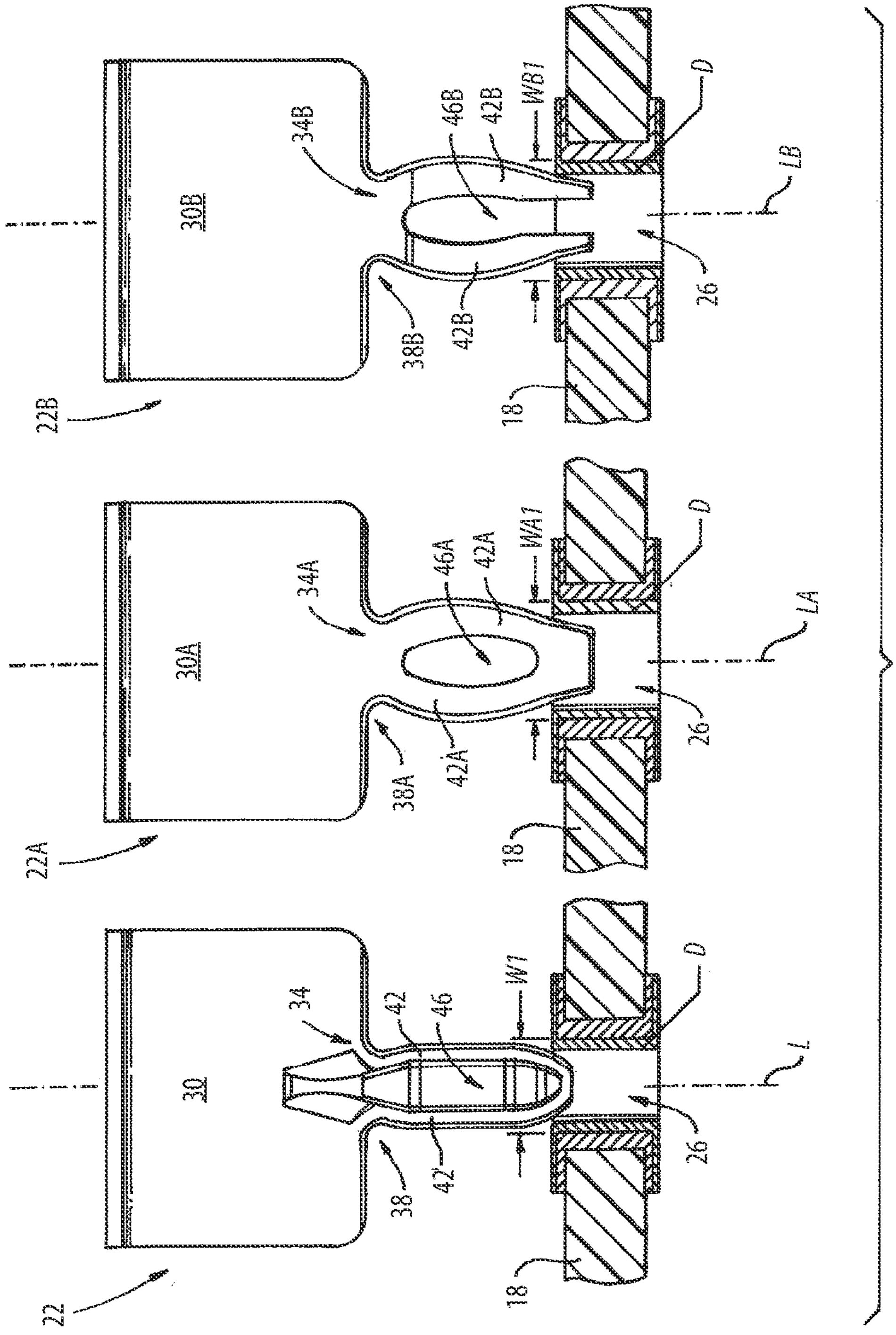
FIG. 3 is a partially cross-sectioned front elevation view of the connectors of FIGS. 2A-2C in a non-deformed and non-connecting condition relative the receiver of FIG. 1, the cross-section taken through the receiver.

As illustrated in FIG. 3, the head 34, 34A, 34B of each of the connectors 22, 22A, 22B has a non-deformed (or natural) width W1, WA1, WB1 at which the head 34, 34A, 34B is not deformed and not received in the socket 26. In the illustrated embodiments, longitudinal axis L, LA, LB bisects the natural width W1, WA1, WB1 of each head 34, 34A, 34B. The natural width W1, WA1, WB1 of each head 34, 34A, 34B is generally larger than a diameter D of the socket 26 so that a pressing force is required to force or drive the head 34, 34A, 34B into the socket 26. Each head 34, 34A, 34B also has a ramped or slanted end that accommodates smooth insertion of the head 34, 34A, 34B into the socket 26, which thereby allows the head 34, 34A, 34B to deform inwardly (e.g., toward the longitudinal axis L, LA, LB).

Figure 4:
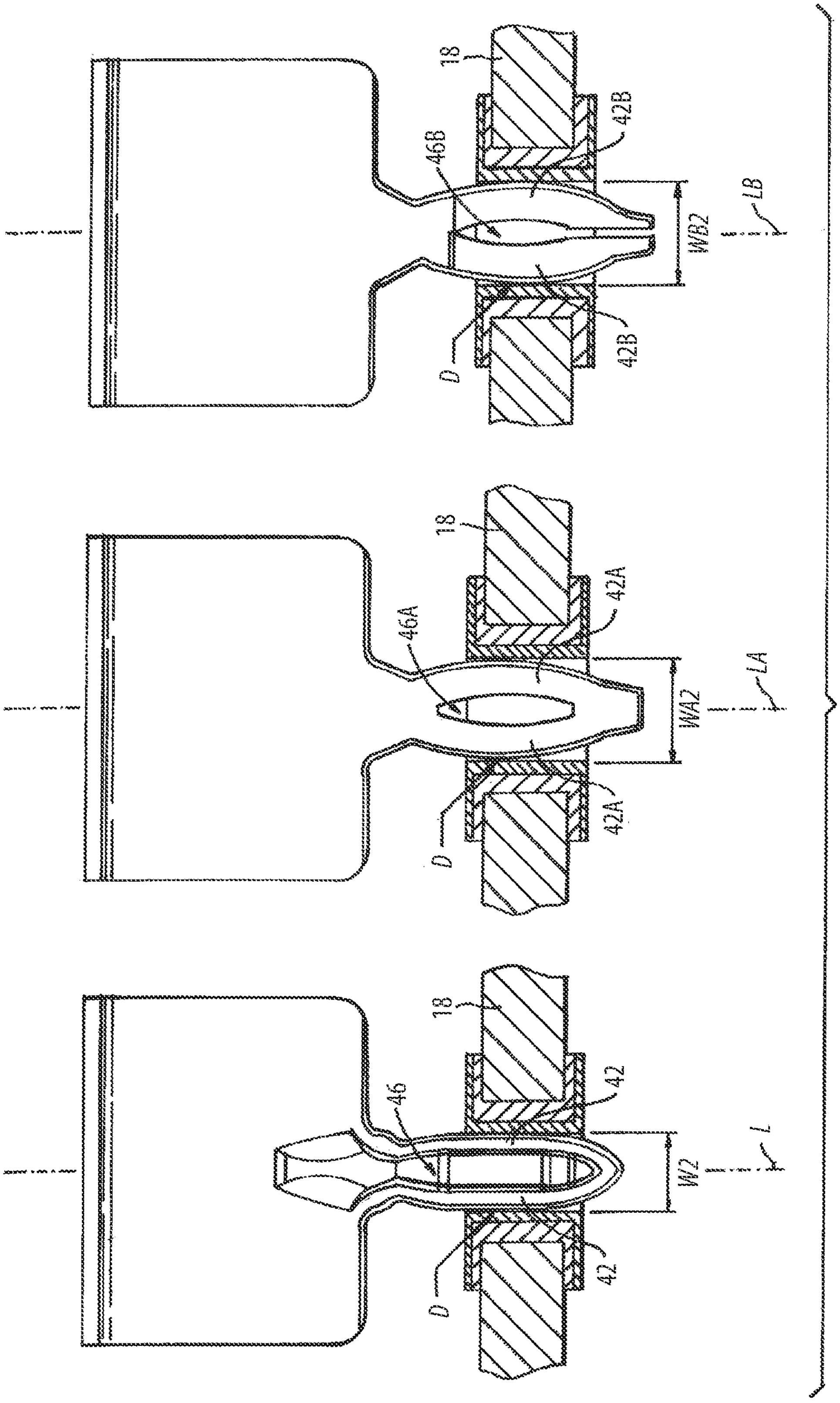
FIG. 4 is another partially cross-sectioned front elevation view of the connectors of FIGS. 2A-sC in a deformed and connecting condition relative the receiver of FIG. 1, the cross-section again taken through the receiver.

As illustrated in FIG. 4, the head 34, 34A, 34B of each of the connectors 22, 22A, 22B has a deformed width W2, WA2, WB2 in which the head 34, 34A, 34B is deformed by and inserted into the socket 26. As the head 34, 34A, 34B is inserted into the socket 26, a width of the head 34, 34A, 34B is reduced from the natural width W1, WA1, WB1 to the deformed width W2, WA2, WB2, which is generally equal to the socket diameter D. An elastic material property of the connector 22, 22A, 22B urges the head 34, 34A, 34B toward the natural width W1, WA1, WB1 such that, when the head 34, 34A, 34B is received in the socket 26, the elastic material property generates an outward (e.g. away from the longitudinal axis L, LA, LB) force on the socket 26. The outward force supplies a holding force that further causes the walls 42, 42A, 42B to press away from one another and bear against the socket 26.

The holding force is generally nominal while the head 34, 34A, 34B is not inserted into the socket 26 and the walls 42, 42A, 42B are in a formed condition, in which the connector 22, 22A, 22B is spaced from the PBCA 18 along the central longitudinal axis L, LA, LB. The holding force is real (i.e., not nominal, greater than nominal) while the head 34, 34A, 34B is inserted into the socket 26 and the walls 42, 42A, 42B are in a deformed condition, in which the connector 22, 22A, 22B overlaps the PBCA 18 along the central longitudinal axis L, LA, LB. With further reference to FIGS. 3 and 4, an overall width or thickness of the cavity 46, 46A, 46B reduces as the head 34, 34A, 34B is inserted into the socket 26. Stated another way, the cavity 46, 46A, 46B accommodates deformation of the connector 22, 22A, 22B as the head 34, 34A, 34B plunges/pushes into the socket 26. As stated above, the head 34, 34A, 34B and the socket 26 may both be conductive such that the holding force physically holds the connector 22, 22A, 22B in the PCBA 18 and additionally conducts electrical energy between the connector 22, 22A, 22B and the PCBA 18.

With reference to FIGS. 5A-5E, the illustrated embodiment of a connector 22 will be described in greater detail. The walls 42 circumferentially extend around the central longitudinal axis L and meet to define a generally semi-circular cross-section of the frame 38 and the cavity 46. In some embodiments, the walls 42 are formed separately and meet with a gap or space therebetween. Other embodiments, such as the illustrated embodiment, include the walls 42 formed as a single unitary part. In some embodiments, during deformation of the head 34, the walls 42 deform inwardly toward one another. In some embodiments, during deformation of the head 34, the walls 42 deform inwardly toward the longitudinal axis L. In each embodiment, the holding or pressing force acts on the socket 26 in a direction opposite of a direction of deformation, as further detailed in FIG. 5C. In such embodiments, the walls 42 cooperate to form an outer semi-circumferential surface 50 that resiliently bears against the socket 26 while the connector 22 is inserted in the socket 26.

Figure 5A:
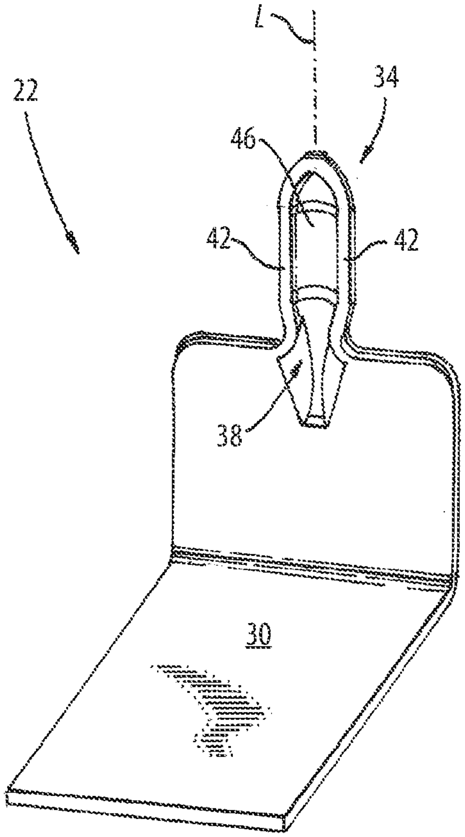
FIG. 5A is a perspective view of an embodiment of the connector of FIG. 1.
Figure 5C:
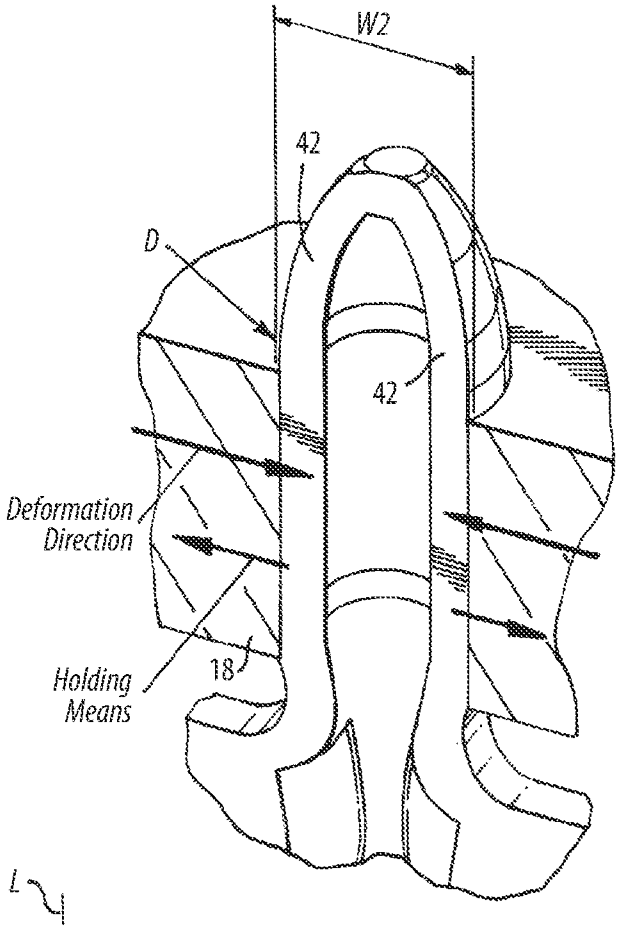
FIG. 5C is a partially cross-sectioned perspective view of the connector of FIG. 5A in the deformed and connecting condition within the receiver of FIG. 1, the cross-section taken through the receiver.
Figure 5B:
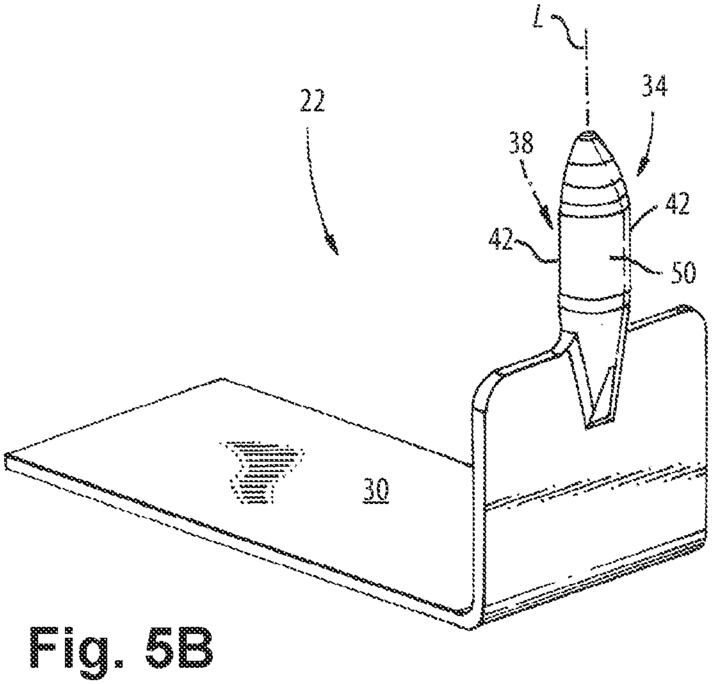
FIG. 5B is another perspective view of the connector of FIG. 5A.
Figure 5D:
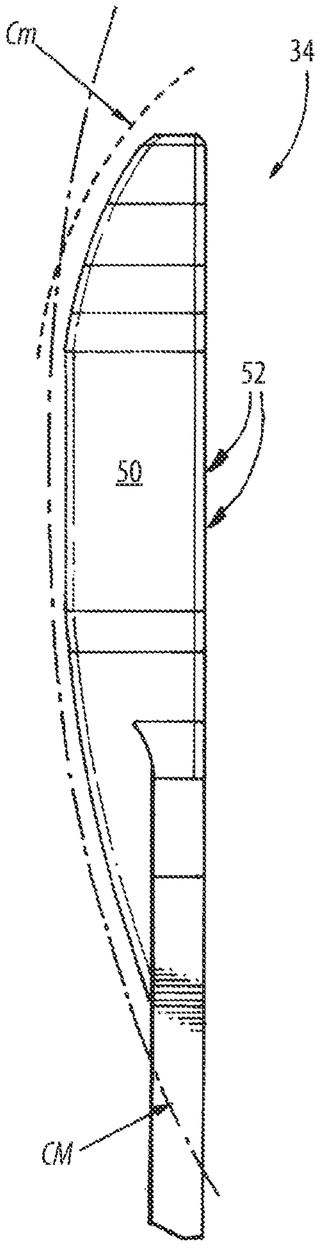
FIG. 5D is a partial side elevation view of the connector of FIG. 5A.
Figure 5E:
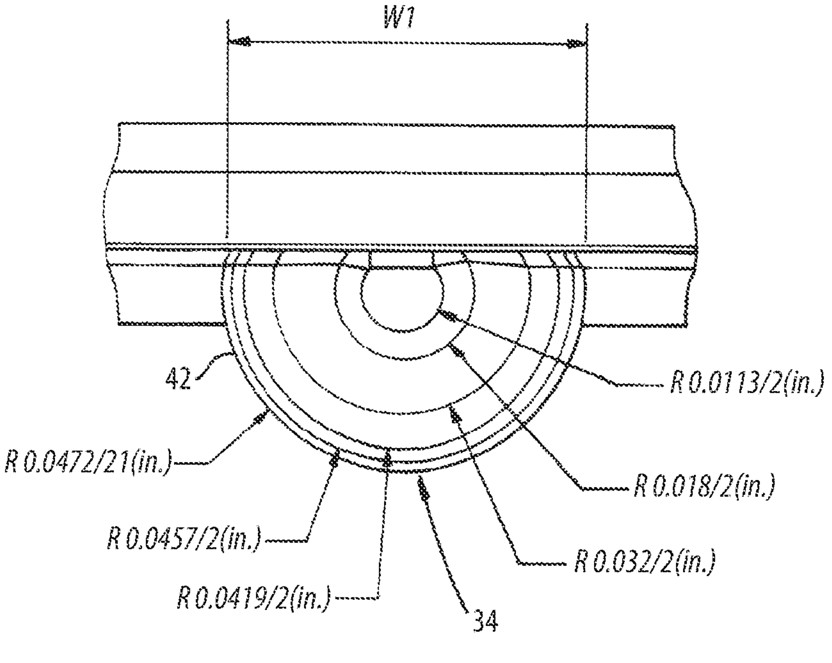
FIG. 5E is a top plan view of the connector of FIG. 5A.

As illustrate in FIGS. 5D and 5E, the head 34 has an overall curved profile having a major curvature CM and a minor curvature Cm. The major curvature CM extends along a majority of the head 34 principally along the longitudinal axis L, while the minor curvature Cm extends along less of the head 34 but still principally along the longitudinal axis L. In other words, the head 34 is defined by an elongated diameter or curvature that is substantially larger than the natural width W1 or the deformed width W2. The head 34 of the illustrated embodiment of the push-pin 22 may be described as "boat shaped."

As specifically illustrated in FIG. 5D, the outer semi-circumferential surface 50 of the head 34 is generally, at least in part, cylindrical and does not curve along the major curvature CM or minor curvature Cm. A surface contact region 52 at least partially defined by ends of the outer semi-circumferential surface 50 is thus intended to provide improved surface contact between walls of the socket 26 and the outer semi-circumferential surface 50 of the head 34.

With continued reference to FIG. 5E, the head 34 may define a plurality of smaller of more exact diameters/radii of curvature. The numerical values provided in FIG. 5E illustrate proportional differences between different radii, which are defined at different heights along the longitudinal axis L. Testing data has indicated that the illustrated "boat shaped" push-pin 22 having a generally semi-circular cross-section defined across the longitudinal axis L and an elongated overall curved profile defined along the longitudinal axis L may provide increased surface contact and conductivity between the push-pin 22 and the socket 26.

Figure 6A:
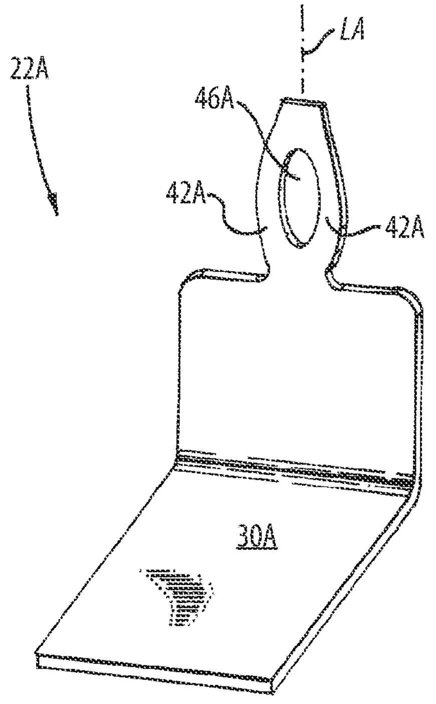
FIG. 6A is a perspective view of another embodiment of the connector of FIG. 1.
Figure 6B:
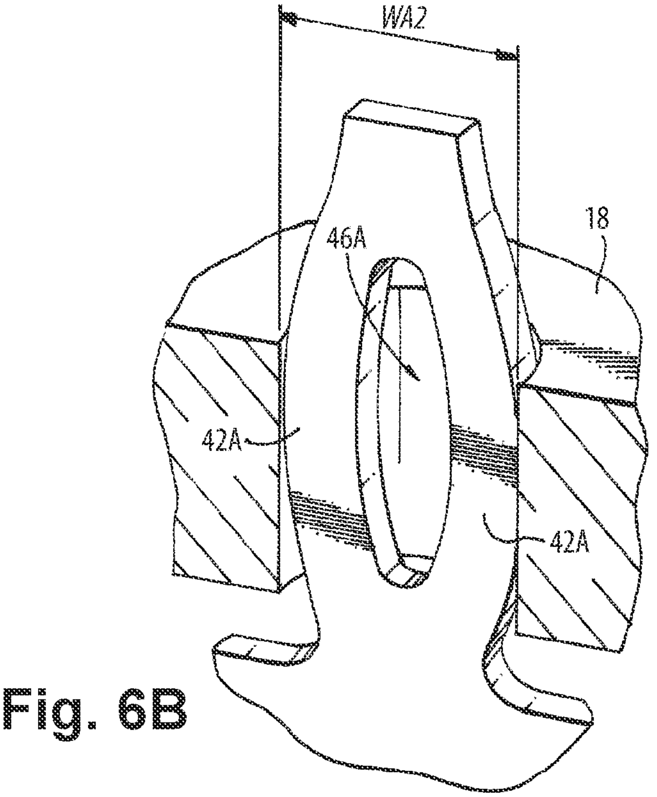
FIG. 6B is a partially cross-sectioned perspective view of the connector of FIG. 6A in the deformed and connecting condition within the receiver of FIG. 1, the cross-section taken through the receiver.

FIGS. 6A and 6B illustrate the connector 22A, according to another illustrated embodiment. The connector 22A of FIGS. 6A and 6B has a generally "eyelet" profile defined by the opposing walls 42A. During deformation, the opposing walls 42A deform inwardly toward one another (e.g., toward the longitudinal axis LA) and generate a holding force against the socket 26 in a direction generally opposite a direction of the deformation. The opposing walls 42A are joined together at an end to define an "eyelet" shaped cavity 46A, which undergoes elongation and thinning during deformation. The opposing walls 42A may alternatively be separate at their distal ends. For example, the opposing walls 42A may be partially or completely separated at their distal ends by a thin slit or gap.

Figure 7A:
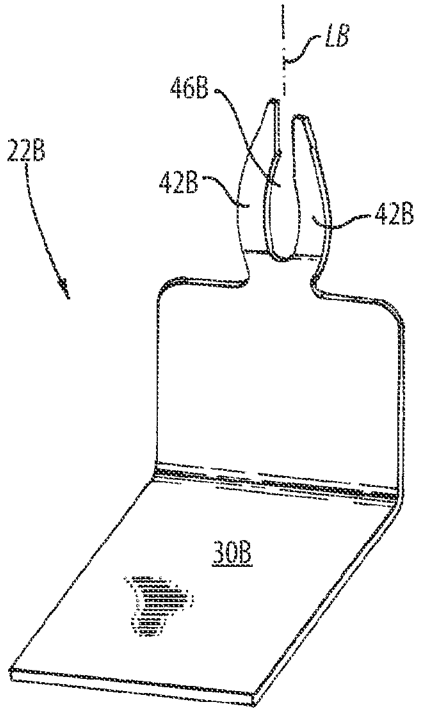
FIG. 7A is a perspective view of another embodiment of the connector of FIG. 1.
Figure 7B:
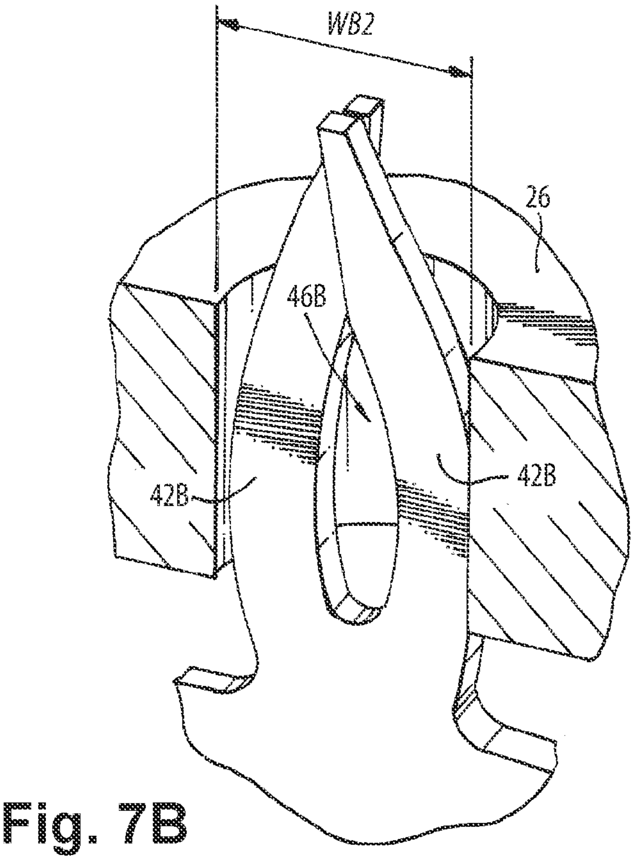
FIG. 7B is a partially cross-sectioned perspective view of the connector of FIG. 7A in the deformed and connecting condition within the receiver of FIG. 1, the cross-section taken through the receiver.

FIGS. 7A and 7B illustrate the connector 22B, according to another illustrated embodiment. The connector 22B of FIGS. 7A and 7B has a generally broken or open "eyelet" profile defined by the opposing walls 42B. During deformation, the opposing walls 42B deform inwardly toward one another (e.g., toward the longitudinal axis LB) and generate a holding force against the socket 26 in a direction generally opposite a direction of the deformation. The opposing walls 42B are separate at their distal ends to define an open topped or broken "eyelet" shaped cavity 46B, which undergoes elongation and thinning during deformation. In the illustrated embodiment, the opposing walls 42B are angled and/or offset relative one another and to the longitudinal axis LB. During deformation, portions of the opposing walls 42B at the free end may overlap across each other and/or the longitudinal axis LB.

Although not specifically discussed herein, other embodiments of an electrically conductive connector are contemplated. For example, such connectors could be needle shaped, fork shaped, c-shaped, curved and split shaped, vertical split shaped, etc. The geometries or shapes of these connectors resemble some features of one or more of the embodiments discussed above.

Various features of the disclosure are set forth in the following claims.

What is claimed is:

1. An electrical system comprising:

a conductor configured to carry energy from an electrical power supply;

a receiver configured to output energy to an electrical component;

a connector electrically and mechanically connecting the conductor and the receiver, the connector including a base, and a head extending from the base along a longitudinal axis, the head including a void defined therein by a radially inner surface, the head further including a radially outer surface, at least a portion of the radially outer surface curved about the longitudinal axis;

wherein the head is insertable into the receiver, and wherein elastic deformation of the head causes the connector to press against the receiver to retain the connector and the receiver together;

wherein the radially inner surface and the radially outer surface of the head are curved about the longitudinal axis along a plane, the plane being orthogonal to the longitudinal axis such that the head extends circumferentially about the longitudinal axis to form a half-cylinder shape; and wherein a majority of the radially outer surface along the plane contacts the receiver.

2. The electrical system of claim 1, wherein the receiver includes a hole formed therein, the hole including an inner surface, and the majority of the radially outer surface of the head contacts a majority of the inner surface of the hole.

3. The electrical system of claim 1, wherein the radially inner surface and the radially outer surface of the head cooperate to define a half-annular cross-section taken orthogonal to the longitudinal axis.

4. The electrical system of claim 3, wherein the head includes a first wall and a second wall, and the first and second walls are principally deformable along an extension of the half-annular cross-section such that the first wall and the second wall are brought closer together.

5. The electrical system of claim 1, wherein the receiver includes a socket having a socket diameter sized to receive the connector, and the connector includes an undeformed width and a deformed width.

6. The electrical system of claim 5, wherein the undeformed width of the connector and the deformed width of the connector extend in a plane orthogonal to the longitudinal axis.

7. The electrical system of claim 6, wherein the undeformed width of the connector is larger than the socket diameter, and the deformed width of the connector corresponds with the socket diameter.

8. The electrical system of claim 1, wherein the connector has a deformable first width extending in a plane perpendicular to the longitudinal axis, the connector has a deformable second width extending in a plane perpendicular to the longitudinal axis, and the second width is larger than the first width.

9. The electrical system of claim 1, wherein the half-cylinder shape is co-axial with the longitudinal axis.

10. The electrical system of claim 1, wherein the radially outer surface forms semicylindrical half-cylinder shape co-axial with the longitudinal axis.

11. A push-pin connector for an electrical system, the push-pin connector comprising:

a central longitudinal axis;

a first deformable wall having an arcuate cross-section, the first deformable wall extending from a base on a first side of the central longitudinal axis to produce a first distal end;

a second deformable wall having an arcuate cross-section, the second deformable wall extending from the base on a second side of the central longitudinal axis to produce a second distal end, the first deformable wall and the second deformable wall spaced from the central longitudinal axis by a first distance in an undeformed condition, and the first deformable wall and the second deformable wall spaced from the central longitudinal axis by a second distance in a deformed condition, the first distance being greater than the second distance;

wherein the first deformable wall and the second deformable wall are resiliently biased toward the undeformed condition to press outwardly relative the central longitudinal axis; and wherein the first distal end is separated from the second distal end to form an open top, and wherein the first distal end and the second distal end are offset relative to one another such that they can overlap each other in the deformed condition.

12. The push-pin connector of claim 11 further comprising a void defined between the first deformable wall and the second deformable wall relative the central longitudinal axis, wherein the void has a first width defined across the central longitudinal axis with the first deformable wall and the second deformable wall in the undeformed condition, and wherein the void has a second width less than the first width defined across the central longitudinal axis with the first deformable wall and the second deformable wall in the deformed condition.

13. The push-pin connector of claim 11, wherein the first deformable wall and the second deformable wall extend circumferentially around the central longitudinal axis to define a semi-annular cross-section.

14. The push-pin connector of claim 11, wherein at least a portion of the first deformable wall and at least a portion of the second deformable wall extend principally along the central longitudinal axis to define a void therebetween, the void having an elliptical opening.

15. The push-pin connector of claim 11, wherein the first deformable wall and second deformable wall are integrally formed together as a unitary body.

16. The push-pin connector of claim 11, wherein the first deformable wall and the second deformable wall are configured to deform due to the push-pin connector being inserted into a printed circuit board assembly such that the first distance transitions to the second distance as the push-pin connector travels into the printed circuit board assembly.

17. The push-pin connector of claim 16, wherein the first deformable wall and the second deformable wall transition from the first distance to the second distance uniformly throughout the push-pin connector along the central longitudinal axis.

18. The push-pin connector of claim 17, wherein the first deformable wall and the second deformable wall transition from the first distance to the second distance non-uniformly throughout the push-pin connector along the central longitudinal axis.

19. An electrical system comprising:

a conductor configured to carry electrical energy from a power supply;

a push-pin base coupled to the conductor;

a push-pin head extending from the push-pin base along a longitudinal axis, the push-pin head including a radially inner surface at least partially curved about the longitudinal axis in a direction perpendicular thereto, the radially inner surface defining a void, and a radially outer surface at least partially curved along a plane oriented orthogonal to the longitudinal axis, the radially outer surface cooperating with the radially inner surface to define an overall deformable semi-annular cross-section of the push-pin head taken orthogonal to the longitudinal axis having an outer diameter; and a printed circuit board assembly electrically and mechanically connected to the push-pin head to output electrical energy from the conductor to a component, the printed circuit board assembly including at least one socket including an inner electrically conductive surface that is circular in cross-section;

wherein at least a majority of the radially outer surface of the push-pin head electrically and mechanically contacts the inner electrically conductive surface of the socket;

wherein the outer diameter of the semi-annular cross-section is reduced to a deformed condition with the push-pin head received in the socket; and wherein the overall deformable semi-annular cross-section of the push-pin head is resiliently biased to an undeformed condition in which the outer diameter of the semi-annular cross-section of the push-pin head is not reduced.

* * * * *